Jan. 11, 1927. 1,613,849
S. S. RIEGEL
PASSENGER CAR WASTE TRANSFER APPARATUS
Filed April 28, 1925  2 Sheets-Sheet 1
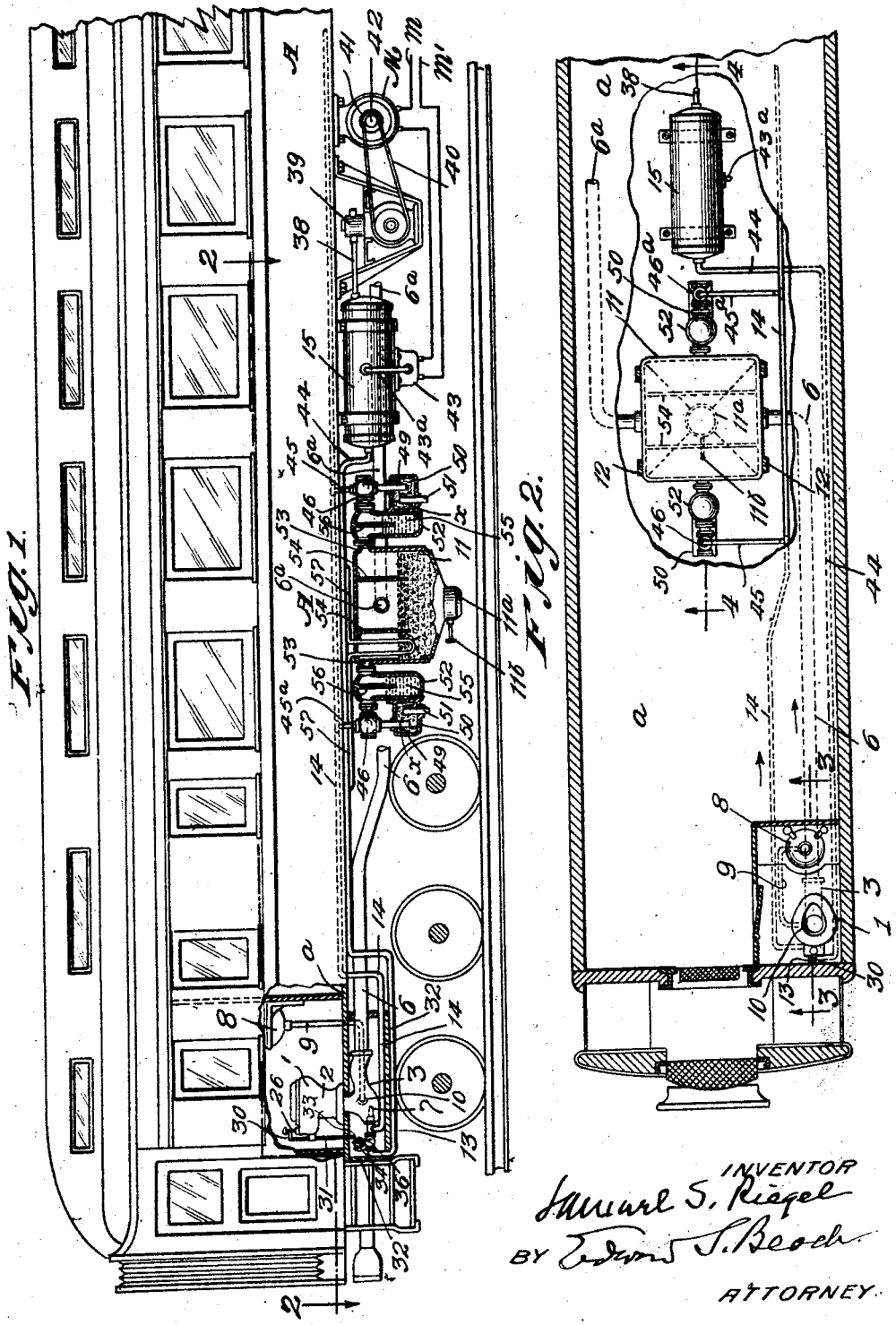

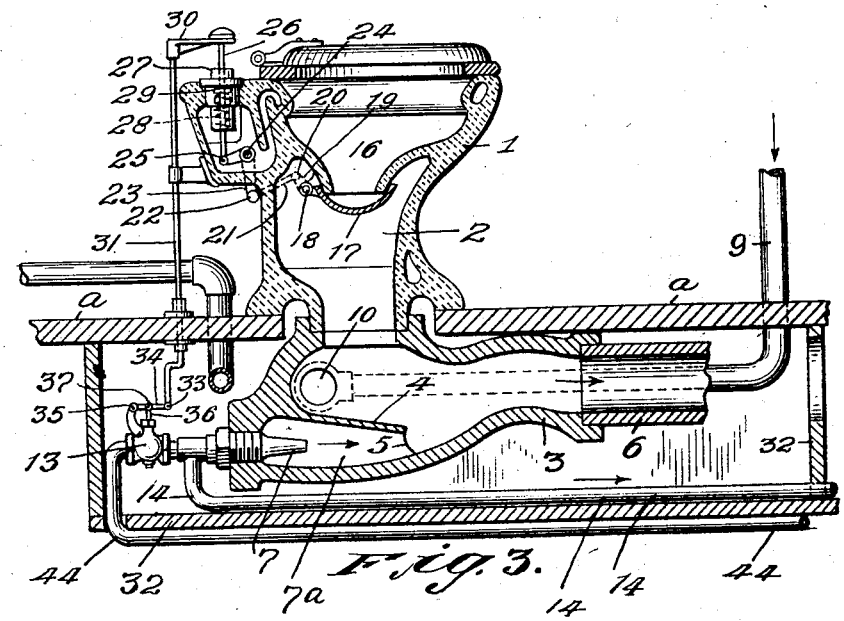
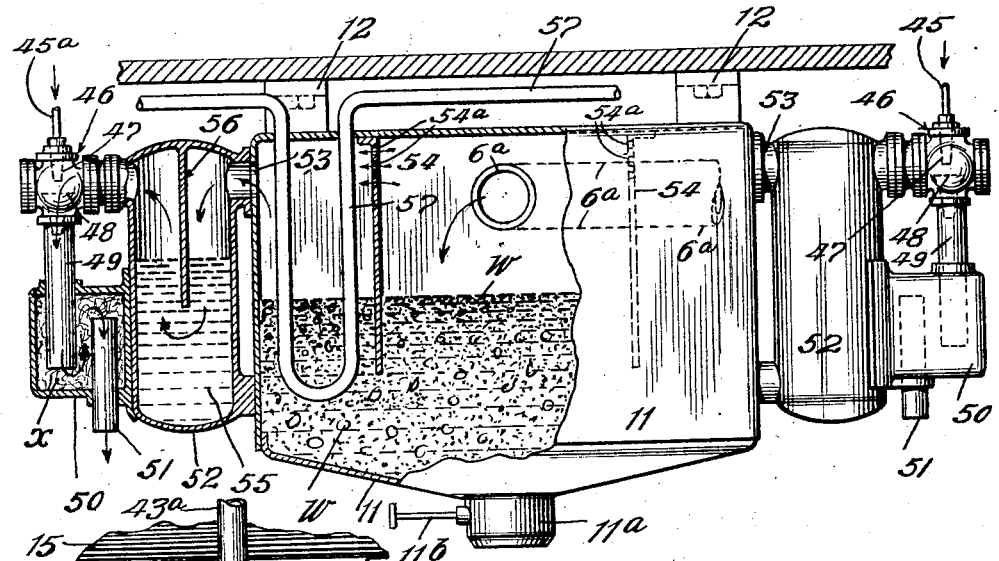

Patented Jan. 11, 1927.

1,613,849

UNITED STATES PATENT OFFICE.

SAMUEL S. RIEGEL, OF SCRANTON, PENNSYLVANIA, ASSIGNOR, BY MESNE ASSIGNMENTS, OF ONE-HALF TO JOHN H. ALLEN, OF JERSEY CITY, NEW JERSEY.

PASSENGER-CAR WASTE-TRANSFER APPARATUS.

Application filed April 28, 1925. Serial No. 26,443.

This invention relates to a passenger car waste transfer apparatus. The object of the invention is to transfer waste from passenger car water closets and wash basins to a temporary storage container which can be discharged at convenient times and places. The mode of operation of the herein described apparatus is embraced in the transfer method set forth in my application Serial No. 26,440, filed contemporaneously herewith relating to railway vehicle ash and other waste transfer method and apparatus.

In the accompany drawings forming a part hereof and illustrating the present invention:

Fig. 1 is a side elevation of a portion of a passenger car embodying the present invention.

Fig. 2 is a horizontal, sectional plan, at line 2—2 of Fig. 1, and shows the water closet and wash basin of a car connected with a temporary storage container and compressed air apparatus suspended from the under side of the car floor.

Fig. 3 is a vertical, sectional view of a water closet, a trap and a pressure nozzle for the trap.

Fig. 4 is a partial, sectional elevation of the temporary storage receiving apparatus.

Fig. 5 is a partially sectionalized electric switch, operable by reduced pressure, shown in Fig. 2.

In the drawings, A indicates a portion of a car and 1 the upper chambered portion of a water closet bowl and 2 its under portion which extends downwardly through the car floor and is connected with a trap 3. The chamber of this trap oppositely to its discharge end, is provided with a transverse approximately horizontal nozzle chamber forming wall 4. The discharge port of the nozzle chamber is indicated by 5 and faces the discharge end of the trap. The discharge end of the trap is in communication with a waste transfer conduit 6. The chamber formed within the trap by the transverse wall 4 above the bottom of the trap is provided with a fluid pressure nozzle 7. When fluid under pressure enters the nozzle chamber 7ª below the wall 4, the waste in said chamber and in the chamber of the trap is driven out of the trap structure into and through the waste conduit 6. The wash basin is indicated by 8 and its discharge pipe by 9. Pipe 9 enters the trap at 10.

As there are commonly two water closets in a car, a waste conduit 6ª from a water closet not shown is indicated as entrant into the temporary storage container 11 opposedly to the entrance of the waste conduit 6 into the container. This container is held suspended from the car floor a by brackets 12. The nozzle 7 is provided with a control valve 13 exteriorly of the trap.

A compressed air conduit 14 connects with the chamber of the control valve and receives air therethrough when the valve is open.

The control valve is connected with the following operating mechanism: The upper portion of the water closet bowl has a chamber 16 in communication with the chamber of its under portion 2. Chamber 16 is provided with a downwardly opening cover 17 hinged on a rod 18 provided with a rocker arm 19. The upper end of the rocker arm is pivoted to an end of a link 21 the other end of which is pivoted at 22 to the downwardly extending arm 23 of a bell crank which is pivoted at its bend 24. The other arm of the bell crank is pivoted at 25 to the bottom of a vertical spindle 26 endwise reciprocable in a chambered bearing 27 supported vertically in the water closet bowl structure. Within the chamber of bearing 27, spindle 26 is enclosed by a coil spring 28 the under end of which bears on the bottom wall of the chamber of the bearing and the other end of which bears on an abutment 29 fixed to the spindle. The upper end of the spindle is provided with a horizontal bracket 30 to which is fixed the upper end of a downwardly extending rod 31. This rod passes through the car floor and into a box 32 that encloses the trap and the control valve, the waste conduit 6 passing from the trap through an end wall of the box 32. The under end rod 31 is pivoted at 33 to an end of a link 34 the other end of which is pivoted at 35 to a stationary member. The valve stem 36 is pivoted at 37 midway between its ends to the link 34. Consequently, when the spindle 26 is pushed downwardly, it admits water from the usual flush water system not shown into the bowl 16, swings open the cover 17 and opens the control valve for passage through it into the intake end of nozzle 7 of compressed air or other suitable fluid under head. In the present embodiment of the invention compressed air is used.

The compressed air reservoir 15 is charged with air under compression through the eduction pipe 38 of an air pump 39 which is driven by a belt 40 from a pulley 41 on a shaft 42 of an electric motor M. The motor, air pump and compressed air reservoir are suspended by suitable brackets from the under side of the car floor. Motor M is driven from any suitable source of electricity which may be located in an electric locomotive or may be car storage batteries, through leads $m$ and $m^1$ that also connect with an electric switch structure 43, for automatically establishing electric current from a suitable source of electricity, not shown, for operating the motor M. Said electric switch structure 43 (Fig. 5) comprises a piston cylinder to which the reference numeral 43 is directly applied. A pipe $43^a$ from the compressed air reservoir enters the upper end portion of the piston cylinder which is provided with a piston P provided on its under side with a downwardly projecting, outwardly flared annulus $p$. A coiled spring $p^1$ has its upper end seated in the annulus, abutting against its upper wall. The under end of the coil spring is seated on a boss $p^2$ the spring extending upwardly into the chamber of the annulus $p$ dependent from the cylinder piston and integral with its bottom member $p^{10}$. The flange of the dependent annulus is provided with an electric contact ring insulated from the flange by insulation $p^4$. Below the piston, the piston chamber contains an upstanding electrode $p^5$ having a downturned upper end for contact with the contact ring $p^3$. Contact $p^5$ is held in electric connection with the lead $m^1$ to a binding stud $p^6$ insulated from the bottom plate $p^7$ of the piston cylinder by insulation $p^4$. Said bottom plate supports an upstanding electrode $p^8$ having a downturned upper end in the path of the contact ring $p^3$, the electrode $p^8$ being held to the bottom plate $p^7$ by a binding stud $p^9$ insulated from the plate by insulation $p^4$.

Air under compression in reservoir 15 passes through a conduit 44 into the compressed air nozzle 7 when the control valve 13 is open.

Said compressed air conduit 14 is operatively connected, as shown, with each of two partial vacuum forming apparatus through a branch pipe 45 for the toilet apparatus shown and through a branch pipe $45^a$ for the toilet apparatus assumed to be in the other end of the car.

When the control valve 13 is open, air from the nozzle 7 blows through the nozzle chamber trap to waste transfer conduit 6 and simultaneously blows through the conduit 14 and its branch pipe 45 into one or both of the partial vacuum forming apparatus. The partial vacuum forming apparatus for the toilet apparatus shown, has a manifold 46 and the partial vacuum forming apparatus for the toilet apparatus not shown, has a manifold 46. Description of one partial vacuum forming apparatus will serve for description of both.

The partial vacuum forming apparatus comprises the manifold 46 into the chamber of which a nozzle 47 depends from the discharge end of the branch conduit 45. The under side of the chambered manifold is provided with an upwardly flaring tube 48 which extends downwardly into a pipe 49 entrant in a tank 50 filled with filtering material $x$. The tank 50 is provided with a discharge tube 51 that passes downwardly through the bottom of the tank, its upper end being in the filtering material and spaced apart from the upper wall of the tank 50 which may be designated as a muffler and filtering tank. Tank 50 is attached to the side of a vertical liquid seal tank 52, one for each container 11 used. The upper end of the liquid seal tank 52 is in ported connection at 53 with an upper portion of the chamber of container 11. This container has two spaced apart, transverse dependent plates 54 that extend downwardly part way to the bottom of the container into the waste W. The plates resist undue surging of the waste in the container. Each plate has its upper end perforated at $54^a$ for outflow of gases.

Compressed air entering the manifolds creates a partial vacuum within their chambers and within the upper portion of the chamber of each liquid seal tank 52 whereby flow of waste from a trap 3, out through a waste transfer conduit 6, into a temporary storage container is induced. Each liquid seal container 52, contains a liquid seal 55, in its bottom portion and each tank has a transverse dependent plate 56 from its top extending part way downwardly to the bottom of the tank and dipping into the liquid seal. This plate prevents undue surging of the liquid seal 55 in the under portion of the seal tank.

The liquid seals and the filtering material prevent escape of odors and gases from the waste W, and tank 50 serves as a muffler for the noise that would otherwise be produced by the rush of air through tube 51 to the atmosphere.

The filtering material may be mineral wool. Heater pipes 57 from any suitable source of heat are shown for chamber of the box 4 and for the chamber of the container 11, the bottom of which is provided with a discharge port $11^a$ controlled by a stopper device having an operating handle $11^b$.

When pressure in the compressed air reservoir 15 falls, the spring $p^1$ forces the piston upwards and carries the contact plate $p^3$ into contact with the downwardly bent ends of the electrodes $p^5$ and $p^8$, whereby a circuit is established through the leads $m$ and $m^1$ for the motor M from any suitable source of electric current.

Various changes in the form of the above described apparatus may be made without departure from the invention.

What I claim is:

1. The combination in a man carrying vehicle with a toilet apparatus including a trap; a fluid pressure jet nozzle entrant in the trap; a valve under the control of an operator for control of a fluid under pressure to the jet nozzle and also to partial vacuum forming apparatus; a temporary waste storage container in communication with the trap; a liquid seal tank in communication with said container; a partial vacuum creating apparatus in communication with the liquid seal tank and also with said control valve; a filtering and noise reducing apparatus in communication with the liquid seal tank and having a discharge port open to the atmosphere; compressed air reservoir in communication through the control valve with the partial vacuum creating apparatus; an air compressor in communication with said reservoir; an electric motor for the compressor; and an automatically operating switch actuated by fall of pressure in the reservoir for operating and controlling the motor and action of the air compressor, the switch and motor being in a power circuit.

2. In a man carrying vehicle, the combination with a toilet apparatus of a temporary waste storage container in conduit communication with said apparatus; a liquid seal tank in communication with the said container; and partial vacuum forming apparatus in communication with said container; the container being provided in its upper portion with a dependent, surge resisting plate extending downwardly part way to the bottom of the container and having a perforated, upper portion to permit escape of gases without passing through waste deposit in the container.

Signed at Scranton, in the county of Lackawanna and State of Pennsylvania, this 9th day of April, A. D. 1925.

SAMUEL S. RIEGEL.